United States Patent [19]
Atsumi et al.

[11] Patent Number: 5,337,173
[45] Date of Patent: Aug. 9, 1994

[54] LIQUID CRYSTAL DISPLAY HAVING A REDUNDANT STORAGE CAPACITOR FOR CONNECTION TO ONE OF PLURAL PIXELS

[75] Inventors: Masakazu Atsumi, Machida; Takeshi Matsumoto, Fujisawa; Toshihiko Yoshida, Yokohama, all of Japan

[73] Assignee: International Business Machines Corporation, Armonk, N.Y.

[21] Appl. No.: 883,094

[22] Filed: May 15, 1992

[30] Foreign Application Priority Data

May 15, 1991 [JP] Japan ............................. 3-138667

[51] Int. Cl.5 ............................................ G02F 1/1343
[52] U.S. Cl. ........................................ 359/54; 359/59; 359/87
[58] Field of Search ................... 359/54, 58, 59, 87

[56] References Cited

U.S. PATENT DOCUMENTS

| | | | |
|---|---|---|---|
| 4,368,523 | 1/1983 | Kawate | 359/59 |
| 4,470,667 | 9/1984 | Okubo et al. | 359/81 |
| 4,775,861 | 10/1988 | Saito | 359/59 |
| 5,042,916 | 8/1991 | Ukai et al. | 359/79 |
| 5,132,819 | 7/1992 | Noriyama et al. | 359/59 |
| 5,173,792 | 12/1992 | Matsueda | 359/58 |

FOREIGN PATENT DOCUMENTS

| | | | |
|---|---|---|---|
| 2232626 | 9/1990 | Japan | 359/59 |
| 2242228 | 9/1990 | Japan | 359/59 |

Primary Examiner—William L. Sikes
Assistant Examiner—Ron Trice
Attorney, Agent, or Firm—David Aker

[57] ABSTRACT

A redundantly constructed liquid crystal display which has high aperture efficiency. Pixels are arranged in a matrix at the intersections of scan and data lines and storage capacitor lines are provided to supply the pixels with storage capacitors. The pixels are arranged in groups of two pixels adjoining each other by arranging scan lines (or data lines) in groups of two pixels closely adjoining each other. One storage capacitor line is provided for every two adjoining pixels between the scan lines (or data lines) and disposed in the same direction as the scan lines (or data lines). Two storage capacitors corresponding to the two adjoining pixels are provided for each storage capacitor line and one auxiliary storage capacitor is provided to be shared by every two adjoining pixels. Alternatively, both the scan lines and the data lines may be arranged in groups of two closely adjacent lines so that a unit or group of four adjacent pixels is formed. The storage capacitor line, then has associated with it a storage capacitor for each of the four pixels and a single auxiliary storage capacitor for the four pixels.

17 Claims, 5 Drawing Sheets

LIQUID CRYSTAL DISPLAY HAVING A REDUNDANT STORAGE CAPACITOR FOR CONNECTION TO ONE OF PLURAL PIXELS

FIELD OF THE INVENTION

The present invention relates to liquid crystal displays using active elements. More particularly it relates to a liquid crystal display which has high aperture efficiency in spite of redundant construction.

BACKGROUND ART

In a high resolution active matrix-type liquid crystal display with a large-sized screen, it is necessary to form picture elements on a scale which is similar to that of a large amount of semiconductor memory such as 1 Megabyte or 4 megabyte DRAM on a screen having a diagonal measuring 10 to 14 inches. It is very difficult to obtain a high yield percentage of finished goods, even in a manufacturing process of good fault tolerance which is, for example, at the same level as that used to produce a DRAM.

In the case of DRAM, auxiliary word and bit lines which serve as auxiliary memory cells are provided so that if there is a fault in a main memory cell, the auxiliary memory cell is used instead of the faulty main memory cell. The DRAM can be used as if it is externally an operationally faultless cell. However, in the case of a liquid crystal display, unless a faulty pixel is repaired at the time of its occurrence, the pixel is never fit for use and, if used, the display will fail to meet acceptable quality standards due to its fault. In an active matrix-type liquid crystal display, for the above reason, it is necessary to provide an auxiliary storage capacitor or non-linear element (TFT, etc.). The larger the active matrix-type liquid crystal display and the higher its resolution, the higher the probability that a fault may occur, and the greater the need for redundant construction.

Generally, in a TFT active matrix-type liquid crystal display, a plurality of scan lines (called gate lines) and a plurality of data lines are formed in the horizontal and the vertical directions, respectively. A TFT, which is a non-linear element, is provided at the respective intersections of the scan lines and the data lines. A respective display electrode, corresponding to each TFT, is provided. Means for applying a scan voltage and a data signal voltage to each scan line and data line, respectively, are also provided. The optical characteristic of a respective liquid crystal element associated with each display electrode is modulated in accordance with the signal voltage. In addition, to prevent picture images from changing due to variations in the characteristics of TFTs or variations in liquid crystal elements, a storage capacitor for each pixel is provided in parallel with the liquid crystal element. There are several methods for forming the storage capacitors.

An example of an arrangement which includes storage capacitors is illustrated with reference to FIG. 1. A data line 32 is disposed in the vertical direction and one electrode of the storage capacitor is connected to a display electrode; the other electrode of the storage capacitor is connected to an electrode line (also called a storage capacitor line or merely a Cs line) 36 formed in the horizontal direction so as to be parallel to a scan line 31.

FIG. 2 is an enlarged view of each pixel, in which an auxiliary storage capacitor is added to achieve a redundant construction. Voltage is applied to a display electrode 34 connected to a source electrode 30 of a TFT 33 selected by the scan line 31 and data line 32 to modulate the optical characteristics of each liquid crystal element. Region 21 represents the semiconductor material of the TFT 33. Regions 24 are formed of an intrinsic amorphous silicon layer and serve as electrical insulators between the scan lines 31 and data lines 32. A storage capacitor 35 is formed and connected in parallel with the display electrode 34 to suppress or mask variation in the characteristics of the liquid crystal elements. One electrode (the top electrode) of storage capacitor 35 is made of the same material as the display electrode 34 and the other is a portion of the Cs line 36, which extends parallel to scan line 31. An insulating film is placed over Cs line 36 to insulate the top electrode of the storage capacitor. The top electrode is an extension of display electrode 34.

In addition, one electrode of an auxiliary storage capacitor 37 is made of the same material as the display electrode 34 and is formed, similarly, over a portion of Cs line 36. Auxiliary storage capacitor 37 is not usually connected to display electrode 34, but is constructed so that it is connected to the display electrode 34, as necessary through a pattern 39, in a switch connection part 38. The pattern 39 is made of the same metal as the scan line 31, with an insulating film between the metal layers.

If the main storage capacitor 35 and the Cs line 36 are short-circuited by a faulty insulating film, etc., that pixel will be displayed as a bright or a dark spot. In this case, the storage capacitor 35 is disconnected from the display electrode 34 along line A—A' by using a YAG laser, or other suitable means. One electrode of auxiliary storage capacitor 37 and the pattern 39, and the display electrode 34 and the pattern 39, are short-circuited, by using the YAG laser, or other suitable means, at a point P and a point Q, respectively, in switch connection part 38, to thereby connect storage capacitor 37 and to repair such a display fault.

As shown in the prior art of FIG. 2, the defect in a pixel, which is caused by a short-circuit between the top electrode of storage capacitor 35 and Cs line 36, can be completely overcome. However, such redundant construction causes the effective area of the liquid crystal element through which light passes to be reduced. In other words, the aperture efficiency, which may be defined as the ratio of the area of one display electrode to the area of one pixel, will decrease.

The aperture efficiency is a major factor in determining the brightness of the display on the screen. It therefore is determinative of the quality of the display and the power consumed by the back light associated with the liquid crystal display.

It is thus a difficult problem to have high yield and a high quality, bright display.

Japanese Published Unexamined Patent Application No.64-73324 discloses the sharing of a Cs line. It does not suggest that its construction is such that an auxiliary storage capacitor is shared by plural as is the case for the present invention, as more fully set forth below.

SUMMARY OF THE INVENTION

It is an object of the present invention to provide a redundantly constructed liquid crystal display which has high aperture efficiency.

In the liquid crystal display apparatus of the present invention, in which a plurality of pixels are arranged in a matrix at the intersections of a plurality of scan lines and a plurality of data lines, and storage capacitor lines are provided to supply the pixels with storage capacitors, the improvement comprises the pixels being arranged in groups of two pixels closely adjoining each other by arranging said scan lines so that for groups of two closely adjoining pixels, one storage capacitor line is provided every two adjoining pixels between the scan lines, the storage capacitor line being disposed in the same direction as that of said scan lines (or between a plurality of the data lines in the direction of the data lines) so that two storage capacitors corresponding to two adjoining pixels for each said group of pixels are provided, and one auxiliary capacitor is provided to be shared by every two adjoining pixels.

A liquid crystal display apparatus of the present invention, in which a plurality of pixels are arranged in a matrix at the intersections of a plurality of scan lines and a plurality of data lines, and storage capacitor lines are provided to supply the pixels with storage capacitors, comprises the improvement of the pixels being arranged in groups of four adjoining pixels by arranging said scan lines so that groups of two pixels closely adjoin each other, and by arranging said data lines so that groups of two pixels closely adjoin each other and a storage capacitor line is provided between the groups of scan lines in the same direction as said scan lines (or between groups of the data lines in the direction of the data lines) so that four storage capacitors corresponding to four adjoining pixels are provided for each said storage capacitor line and so that one auxiliary storage capacitor is provided to be shared by every four adjoining pixels.

This differs markedly from a conventional liquid crystal display, wherein one scan line, one data line, one Cs line, and one auxiliary capacitor are provided for each pixel. In the liquid crystal display constructed in accordance with the present invention, a Cs line common to two adjacent pixels, that is, an upper and a lower pixel or a right and a left pixel between which the Cs line is placed, or to four adjacent pixels, that is, an upper right, a lower right, a lower left, and a upper left pixel between two of which pairs the Cs line placed, and as auxiliary storage capacitor shared by the two or the four pixels is provided to decrease the area occupied by the storage capacitor line for each pixel and increase the effective area of the liquid crystal elements.

From the standpoint of the actual frequency of faults, there is almost zero probability that faults occur successively in adjacent pixels and therefore the the sharing of the auxiliary storage capacitor by adjacent pixels does not hinder the repair of faults.

DETAILED DESCRIPTION OF THE PREFERRED EMBODIMENTS

The present invention is described in accordance with an example in which TFTs are used as non-linear elements. It will be understood that diodes may also be used. Three embodiments (1), (2), and (3), of the present invention are summarized in order.

1. An active matrix-type liquid crystal display is constructed so that a plurality of scan lines (gate lines) provided in the horizontal direction are arranged so as to be closely adjacent in unit or group of two lines. Display electrodes for liquid crystal elements driven by the scan lines are arranged on both sides of the two adjacently arranged scan lines. A Cs line is provided between two adjacent pixels disposed on a side of the display electrode opposite to that of the scan lines and runs in a direction parallel to that of the scan lines. An auxiliary storage capacitor is shared by two pixels.

2. An active matrix-type liquid crystal display, is constructed so that a plurality of data lines provided in the vertical direction are arranged so as to be closely adjacent in a unit or group of two lines. Display electrodes for liquid crystal elements driven by the data lines are arranged on both sides of the two adjacently arranged data lines. A Cs line is provided between pixels and is disposed on a side of the display electrode opposite to that of the data lines and runs in a direction parallel to that of the data lines. An auxiliary storage capacitor is shared by two pixels.

3. An active matrix-type liquid crystal display, is constructed so that a plurality of scan lines (gate lines) provided in the horizontal direction are arranged so as to be closely adjacent in a units or groups of two lines. A plurality of data lines provided in the vertical direction are arranged so as to be closely adjacent in units or groups of two lines. Display electrodes for liquid crystal elements driven (through active devices) by the scan lines and by the data lines are arranged on both sides of the two scan lines and the two data lines. Cs lines are provided on sides of the display electrodes opposite those to which the scan lines and the data lines are connected. The Cs lines run in a direction parallel to that of the scan lines or the data lines. An auxiliary storage capacitor is shared by the four pixels, with a Cs line running between them so that there are two pixels on one side of the Cs line and two pixels on the opposite side of the Cs line.

These embodiments are described by reference to FIG. 3, FIG. 4 and FIG. 5.

Figure 3:
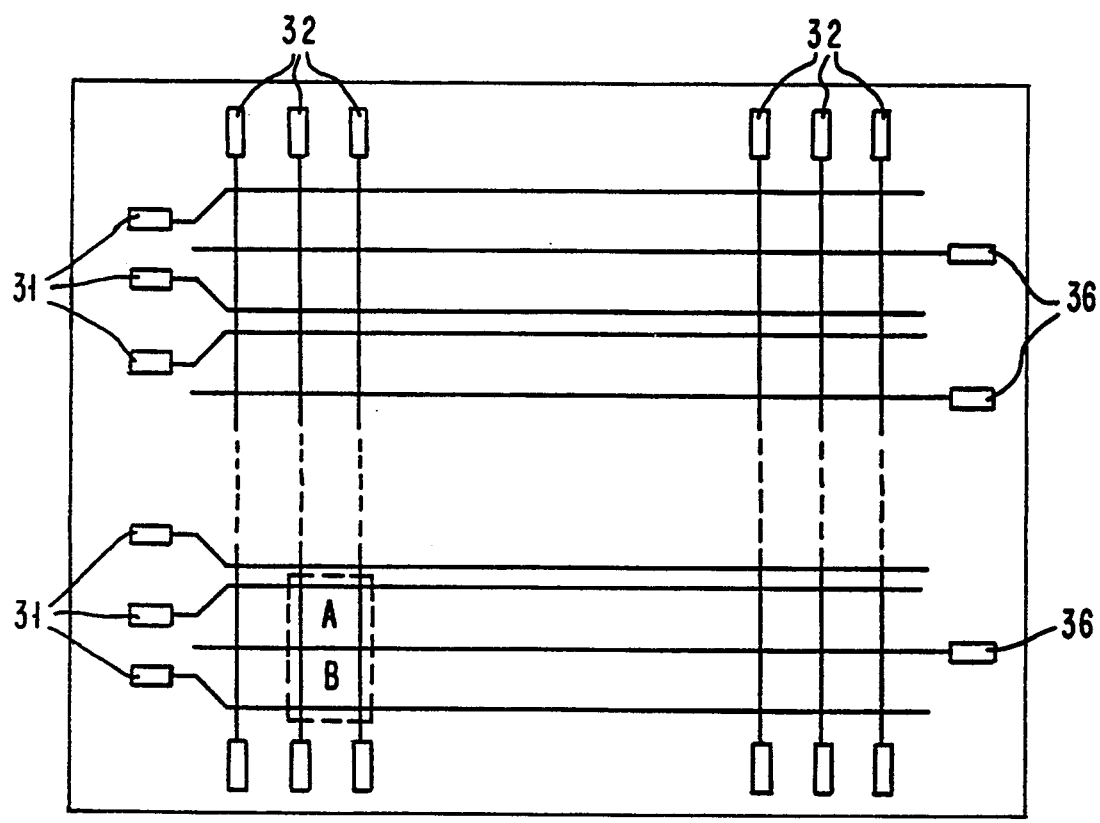
FIG. 3 illustrates a panel having the construction of the embodiment of FIG. 4 according to the present invention.

FIG. 3 is a diagram showing the arrangement of the scan, the data, and the Cs lines of the first embodiment of the present invention. Two pixels A and B are repeated as a basic unit. In FIG. 3, scan lines 31 are bus lines for gate electrodes and data lines 32 are bus lines for drain electrodes. Two scan lines 31, as shown in FIG. 3, are arranged so as to be closely adjacent every two lines and a Cs line 36, which is a bus line for a storage capacitor electrode, is provided between the two pixels A and B.

Figure 4:
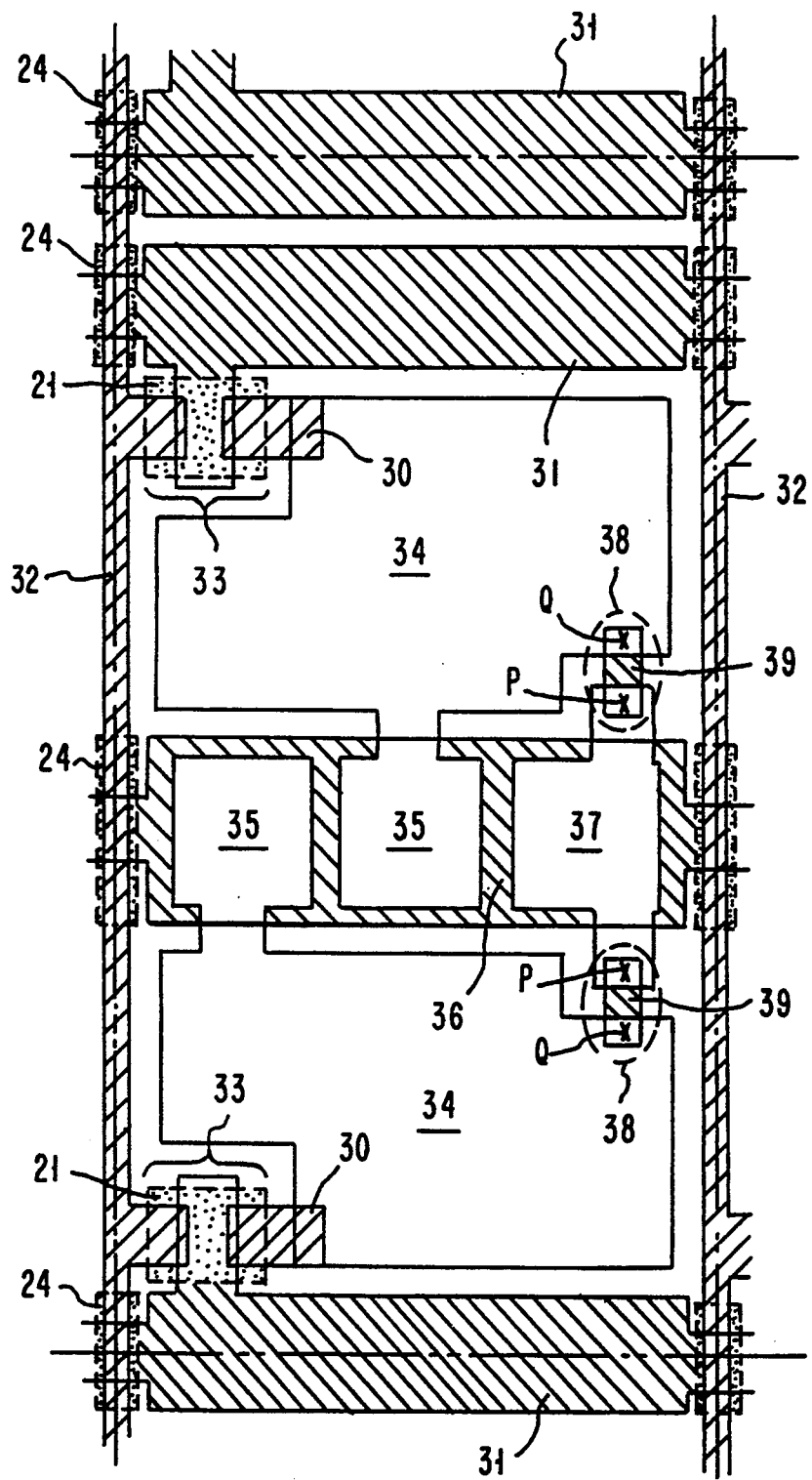
FIG. 4 illustrates an embodiment of the present invention.

FIG. 4 is an enlarged top view showing a portion of the TFT array of FIG. 3 including pixels A and B. The TFT array has a function equivalent to the conventional TFT array shown in FIG. 2. In FIG. 4, (with reference numerals corresponding to those of FIG. 2) 31 is a scan line (gate electrode), 32 a data line (drain electrode), 36 a shared Cs line, 35 is a storage capacitor, 37 an auxiliary storage capacitor shared by the two pixels A and B, 33 is part of a TFT, 34 a display electrode, 38 a switch connection part, 39 a pattern, which is a component of the switch connection part, made of the same metal as the scan line (gate electrode), 21 a semiconductor layer and 30 a source electrode for connecting the TFT part to the display electrode. According to the construction of the present invention, Cs line 36 and auxiliary storage capacitor 37 are shared, as shown in FIG. 4, by two respective pixels so that the area occupied by the display electrode can be increased. Because there are some rules of pattern design, reference to the precise extent of the improvement resulting from the present invention cannot be made. However, in comparing FIG. 4 and FIG. 2 drawn by following the same design procedure, it is apparent that the area of the display electrode shown in FIG. 4, constructed in accordance with the present invention, may be approximately 20% greater than that of the prior art.

The second embodiment discussed above can be constructed in essentially the same manner as the first embodiment. Its construction is such that two data lines are arranged to be closely adjacent to one another (instead of scan lines as shown in FIG. 3 and FIG. 4) and the Cs line 36 is provided between two adjacent pixels A and B which are arranged so as to be parallel to the direction of the data lines (horizontal).

Figure 5:
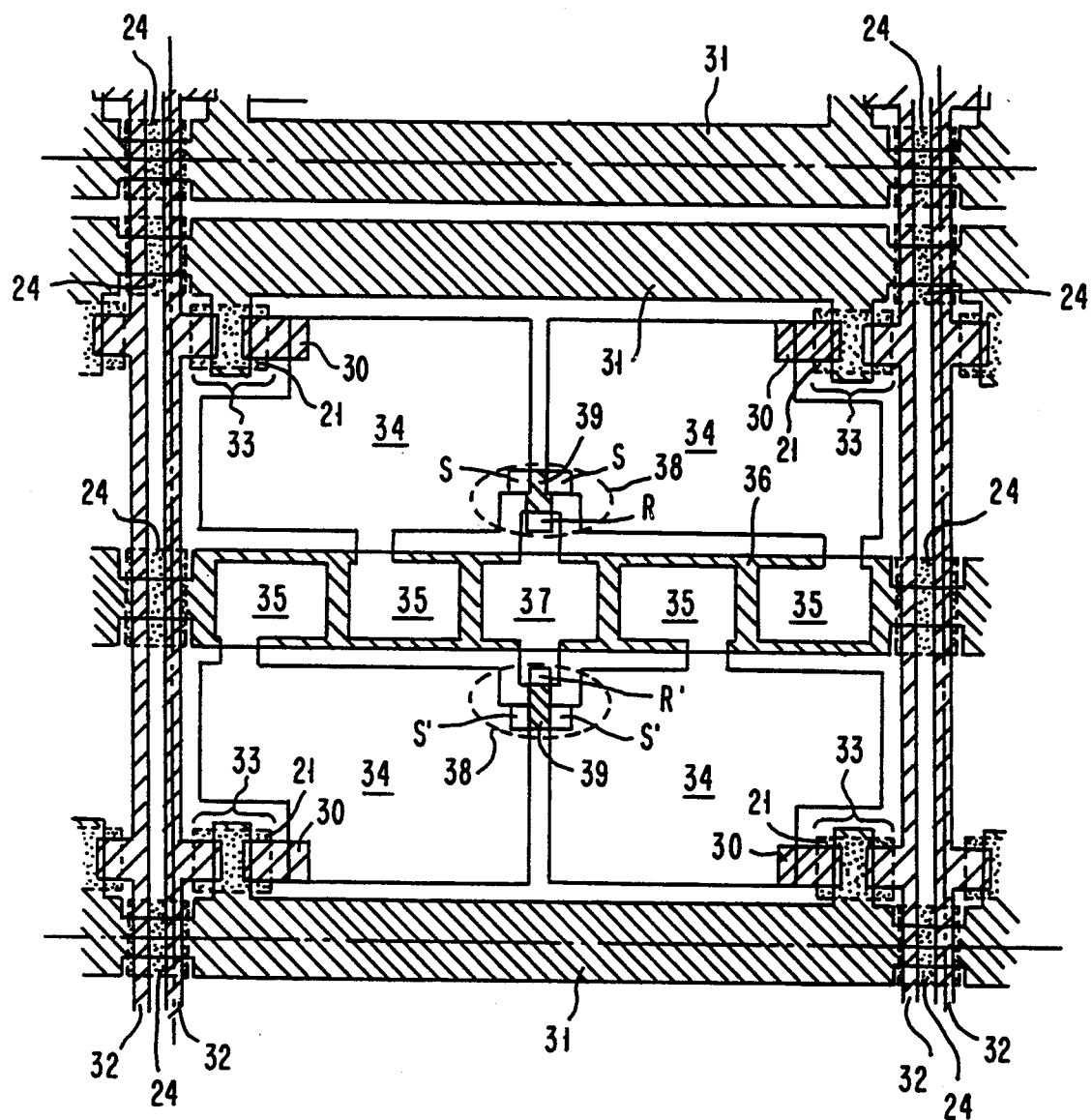
FIG. 5 illustrates another embodiment of the present invention.

FIG. 5 is a top view showing a TFT array of the enlarged pixels of the third embodiment according to the present invention with reference numerals being the same as for the corresponding components of FIG. 4. Pairs of scan lines (gate electrodes) 31 are positioned so as to be closely adjacent and pairs of data lines 32 are similarly positioned so as to be closely adjacent. Thus, a basic unit which is to be repeated contains four pixels. In FIG. 5, a Cs line 36 is disposed in a direction parallel to the scan lines (gate electrode) 31. However, it will be understood that Cs line 36 may be disposed in a direction parallel to data lines 32. To make a repair, a defective capacitor 35 may be disconnected using a YAG laser. One of the patterns 39 is short circuited to the top electrode of capacitor 37 with a YAG laser at one of two points R or R' and then to one of the pixel electrodes 34 at one of two points S (for a short at R) or one of two points S' (for a short at R'). In this embodiment, an auxiliary storage capacitor is shared by four pixels. Thus the area of a display electrode shown in FIG. 5 designed according to the present invention, can be increased by approximately 30% as compared to that of the prior art of FIG. 2.

In the embodiments described above, it is assumed that the size of the auxiliary storage capacitor 37 is the same as that of the main storage capacitor 35. However, it will be appreciated that the size of the auxiliary storage capacitor 37 may be smaller than that of the main storage capacitor 35 within the range of fault tolerance. If this is the case, even higher aperture efficiency can be obtained.

Figure 1:
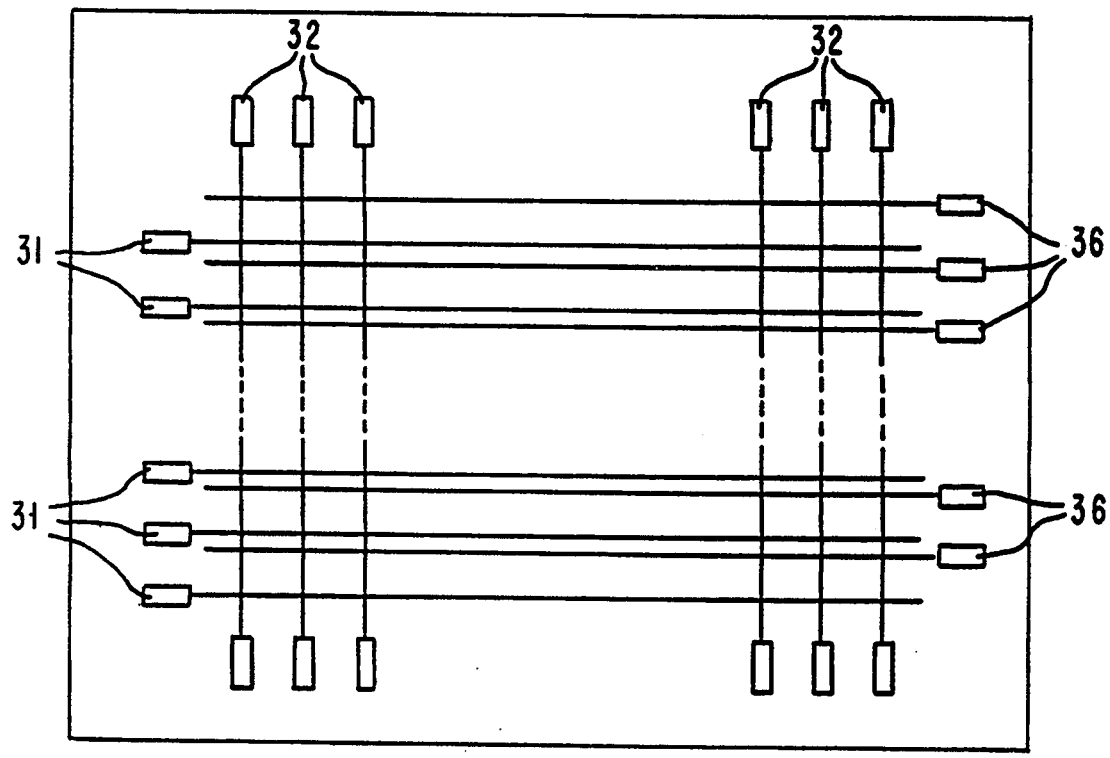
FIG. 1 illustrates an LCD panel having conventional redundant construction.
Figure 2:
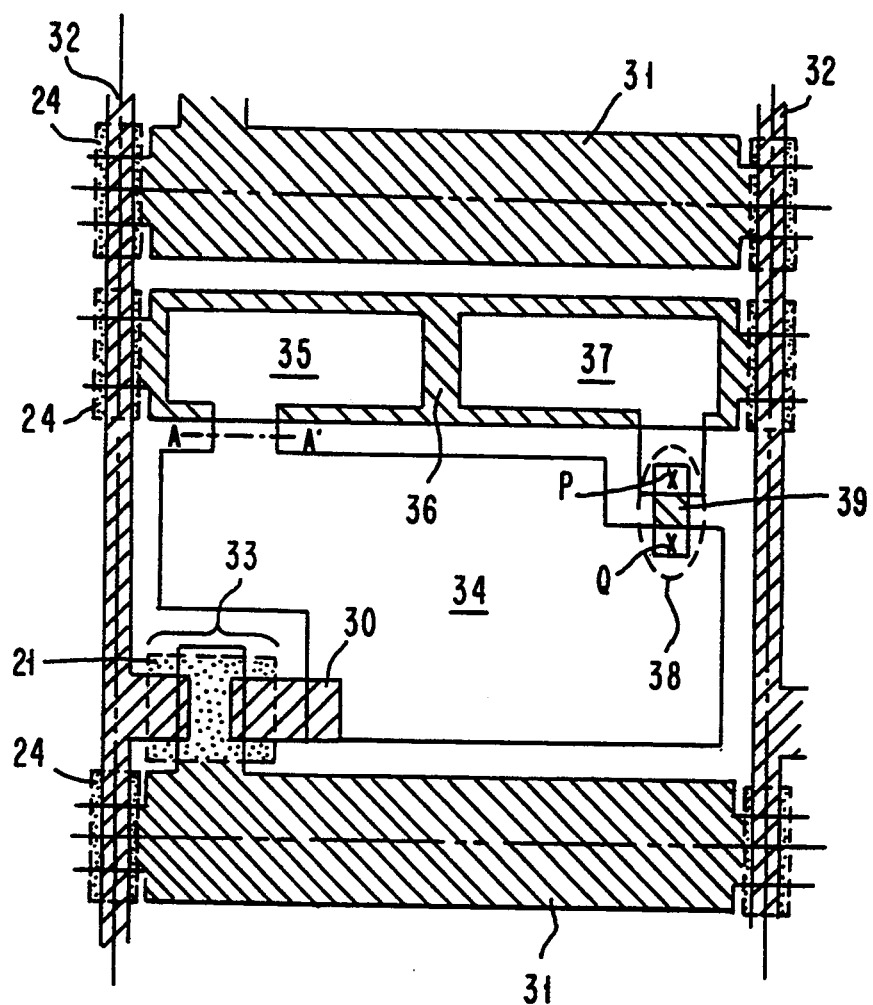
FIG. 2 illustrates conventional redundant construction.

Further, if the occurrence of a fault tends to be confined to certain areas on the display screen, the conventional construction of FIG. 2 may be combined with the invention by also using the construction of two pixels sharing an auxiliary storage capacitor, and the construction of four pixels, sharing an auxiliary storage capacitor, depending on areas in which a fault is likely to occur. For example, if a fault is apt to occur in the upper or lower area rather than the middle area of the display screen, the construction of the first embodiment of the invention may be used for the middle area and the conventional construction of higher redundancy than in the first embodiment may be used for the upper or lower area on the display screen.

The present invention has a major advantage in that high aperture efficiency can be obtained in spite of redundant construction. It may be applied to both monochrome displays and color displays.

While the invention has been described in connection with specific embodiments, it will be understood that those with skill in the art may be able to develop variations of the disclosed embodiments without departing from the spirit of the invention or the scope of the following claims:

We claim:

1. A liquid crystal display comprising:
   a plurality of data lines;
   a plurality of scan lines crossing said data lines;
   a plurality of pixels, each pixel being associated with a crossing of a gate line and a data line, said plurality of pixels being arranged in a plurality of pixel groups, and each of said pixel groups comprising two or more pixels;
   a storage capacitor for each pixel;
   an auxiliary storage capacitor for each pixel group disposed for connection to any one of said pixels in said pixel group;
   a capacitor line extending though said group of pixels, said capacitor line having associated therewith said storage capacitors and said auxiliary storage capacitor; and
   means for selectively connecting said auxiliary storage capacitor to one of said pixels in said pixel group.

2. The liquid crystal display of claim 1, further comprising:
   severable connection means connecting each storage capacitor to a respective one of said plurality of pixels.

3. The liquid crystal display of claim 1 wherein each pixel group includes two pixels.

4. The liquid crystal display of claim 1 wherein each pixel group includes four pixels.

5. The liquid crystal display of claim 1 wherein said auxiliary storage capacitor has a capacitance less than the capacitance of said storage capacitors.

6. The liquid crystal display of claim 1 wherein the scan lines are arranged in scan line groups having two scan lines in each scan line group, and the pixel groups are disposed between adjacent scan line groups.

7. The liquid crystal display of claim 1 wherein the data lines are arranged in data line groups having two data lines in each data line group, and the pixel groups are disposed between adjacent data line groups.

8. The liquid crystal display of claim 1 wherein the scan lines are arranged in scan line groups having two scan lines in each scan line group, and the pixel group are disposed between adjacent scan line groups; and the data lines are arranged in data line groups having two data lines in each data line group, and the pixel groups are disposed between adjacent data line groups.

9. A liquid crystal display comprising:
   a plurality of data lines;
   a plurality of scan lines crossing said data lines,
   a plurality of pixels, each pixel being associated with a crossing of one of said scan lines and one of said data lines;
   at least one of the scan lines and the data lines being arranged in spaced line groups having two lines in each line group and the plurality of pixels being disposed in pixel groups between adjacent line groups;

a storage capacitor line disposed between one of the line groups and disposed in a direction parallel to the lines in said one of the line groups so that at least one pixel of a pixel group is disposed on a first side of said storage capacitor line and at least one pixel of said pixel group is disposed on a second side of said storage capacitor line, said second side being opposite to said first side; and said storage capacitor line being associated with a respective storage capacitor for each pixel in said pixel group and an auxiliary storage capacitor for connection to any one of the pixels in said pixel group.

10. The liquid crystal display of claim 9, further comprising:

means for selectively connecting said auxiliary storage capacitor to one of said pixels in said pixel group.

11. The liquid crystal display of claim 9, further comprising: severable connection means connecting each storage capacitor to a respective one of said pixels.

12. The liquid crystal display of claim 9, wherein each pixel group includes two pixels.

13. The liquid crystal display of claim 9 where each pixel group includes four pixels.

14. The liquid crystal display of claim 9 wherein said auxiliary storage capacitor has a capacitance less than the capacitance of said storage capacitors.

15. The liquid crystal display of claim 9 wherein the scan lines are arranged in scan line groups having two scan lines in each scan line group, and the pixel groups are disposed between adjacent scan line groups.

16. The liquid crystal display of claim 9 wherein the data lines are arranged in data line groups having two data lines in each data line group, and the pixel groups are disposed between adjacent data line groups.

17. The liquid crystal display of claim 9 wherein the scan lines are arranged in scan line groups having two scan lines in each scan line group, and the pixel groups are disposed between adjacent scan line groups; and the data lines are arranged in data line groups having two data lines in each data line group and the pixel groups are disposed between adjacent data line groups.

* * * * *